(No Model.)
G. E. WHEELER.
PROCESS OF EVAPORATING MAPLE SAP OR OTHER FLUIDS.
No. 438,787. Patented Oct. 21, 1890.
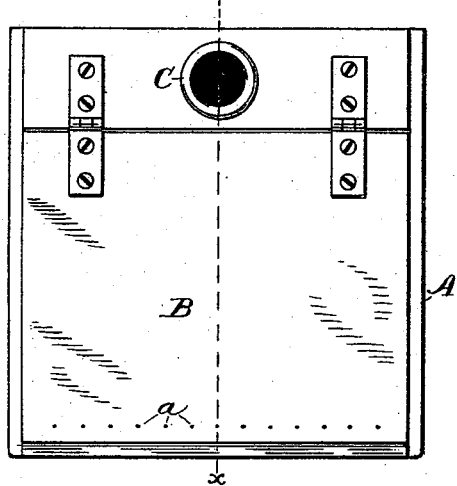
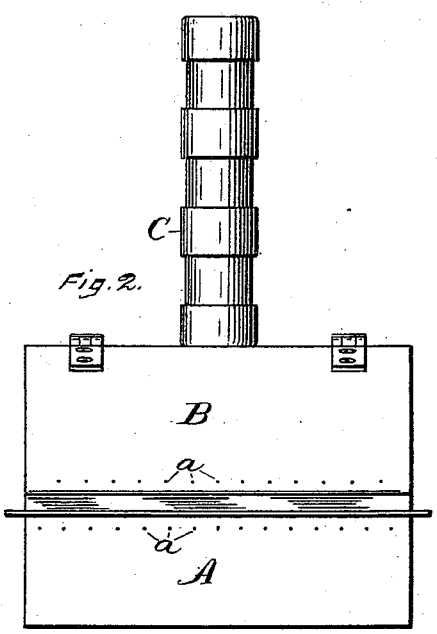
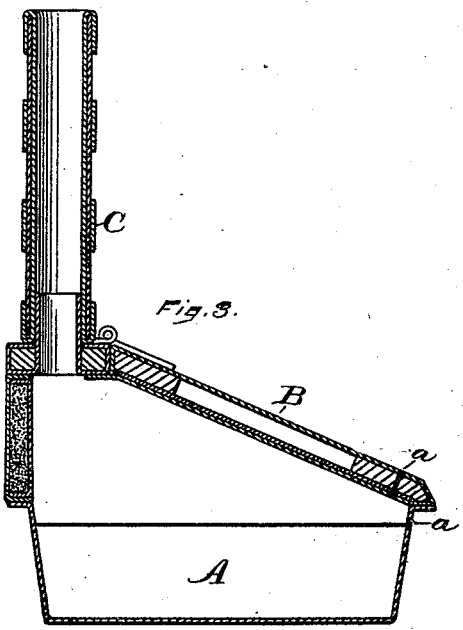
Witnesses.
John Edwards Jr.
W. H. Whiting
Inventor.
George E. Wheeler.
By James Shepard
Atty.

UNITED STATES PATENT OFFICE.

GEORGE E. WHEELER, OF CHAZY, NEW YORK.

PROCESS OF EVAPORATING MAPLE-SAP OR OTHER FLUIDS.

SPECIFICATION forming part of Letters Patent No. 438,787, dated October 21, 1890.

Application filed August 29, 1888. Serial No. 284,056. (No specimens.)

*To all whom it may concern:*

Be it known that I, GEORGE E. WHEELER, a citizen of the United States, residing at Chazy, in the county of Clinton and State of New York, have invented certain new and useful Improvements in the Process of Evaporating Maple-Sap or other Fluids, of which the following is a specification.

My invention relates to the process of evaporating fluids in shallow open-top pans in contradistinction to those methods in which the fluid is evaporated within a series of pipes.

The objects of my invention are to hasten the evaporation and improve the quality of the product.

In the accompanying drawings, Figure 1 is a plan view of an evaporating-pan and cover suitable for use in the practice of my process. Fig. 2 is a front elevation of the same, and Fig. 3 is a transverse section thereof on line *x x* of Fig. 1.

A designates the pan, which may be of any ordinary form and style of open-top and shallow evaporating-pans now in use, the same being mounted in any suitable manner for subjecting the pan and its contents to heat. I provide said pan with an insulated cover B and insulated chimney or draft-tube C. The chimney should be high enough to give it a suitable draft, and the chimney and cover may be insulated or protected by any known means of insulating—as, for instance, by constructing them of double or triple thicknesses — formed wholly or in part of some non-conducting material— as, for instance, asbestus—so that the vapor arising within the pan and chimney will not be condensed to any appreciable extent prior to being discharged therefrom.

In order to supply the draft-tube and chimney with air for creating a draft without at the same time causing any appreciable condensation of steam, I make provision for the admission of minute quantities of air into the pan or the cover above the fluid in the pan, the air being admitted in such thin sheets or small veins as to be immediately heated upon entering the pan. In the drawings I have illustrated the inlet-passages as formed by mere pinholes *a* in the cover and pan at points near the upper edge of the pan. Said pinholes might be formed in the cover only or in the pan only, or they might be wholly omitted, and in lieu thereof a minute or thin space might be left between the cover and upper edge of the pan, which space may be adjusted, if desired, by a screw. If desired, the air-inlet may be covered by a hood and supplied with heated air.

I place the fluid to be evaporated within the pan, put the cover over the pan and fluid, thereby completely closing the evaporating-chamber formed by said cover and pan, excepting at the air inlet and discharge apertures, subject the pan and fluid to heat, thereby heating the entire evaporating-chamber, permit the heated air and vapor to flow naturally from the chimney or chimneys under expansion, and simultaneously therewith permit air to flow into the evaporating-chamber to feed the natural draft, and by means of the insulated cover I maintain a temperature above that at which steam will condense—for instance, about 210° Fahrenheit—as fluid vaporizes at 212°. By permitting a natural flow of air protected as described I retain the greatest possible amount of heat within the evaporating-chamber consistent with the quick discharge of vapor therefrom. By thus insulating the cover and chimney I protect their contents from the external air and pressure of the atmosphere and maintain a high temperature, so that steam does not condense and collect upon the inside of the cover and pan, while at the same time the provision for the inlet of air furnishes a supply for the draft-tube, so that the evaporation is hastened. To insulate the cover and chimney without provision for feeding the chimney will retard instead of increase the evaporation, and therefore not accomplish the objects of my invention. On the other hand, if cold air was admitted in large quantities the proper heat could not be maintained, and it would condense the steam, the steam so condensed falling again into the pan to be reconverted into steam, thereby unnecessarily prolonging the process. I not only hasten the process of evaporation, but I believe that a better product is obtained. I accomplish this result by simple and inexpensive means, my process being particularly adapted for use with the ordinary shallow and open-top pans now in common use.

Some features of the cover herein shown, but not claimed, are described and claimed in my patent, No. 393,196, dated November 20, 1888.

I claim as my invention—

That improvement in the art of evaporating fluids which consists of placing the fluid in a suitable vessel, covering said vessel and fluid to completely close the evaporating-chamber with the exception of proper air inlet and discharge apertures for drawing off the vapor, subjecting said fluid and evaporating-chamber to heat, permitting heated air and vapor to flow from said evaporating-chamber simultaneously with an indraft of air in quantity sufficient to feed the discharge, but not to reduce the temperature in the chamber above the fluid, and protecting said chamber from contact with the atmosphere, whereby a constant high temperature that will substantially avoid condensation is maintained, substantially as described, and for the purpose specified.

GEORGE E. WHEELER.

Witnesses:
EDWARD B. LADD,
FRANCIS E. WHEELER.